United States Patent
Lee et al.

(10) Patent No.: US 8,656,097 B2
(45) Date of Patent: Feb. 18, 2014

(54) SELECTION OF DATA STORAGE LOCATIONS BASED ON ONE OR MORE CONDITIONS

(75) Inventors: Sang-hoon Lee, Suwon-si (KR); Se-wook Na, Suwon-si (KR); In-sik Ryu, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 425 days.

(21) Appl. No.: 12/557,606

(22) Filed: Sep. 11, 2009

(65) Prior Publication Data

US 2010/0070689 A1    Mar. 18, 2010

(51) Int. Cl.
*G06F 12/00* (2006.01)

(52) U.S. Cl.
USPC ..... 711/113; 711/112; 711/103; 711/E12.019

(58) Field of Classification Search
USPC ............................ 711/112, 103, 113, E12.019
See application file for complete search history.

(56) References Cited

U.S. PATENT DOCUMENTS

| | | | | |
|---|---|---|---|---|
| 5,313,631 A | * | 5/1994 | Kao | 1/1 |
| 5,812,883 A | * | 9/1998 | Rao | 710/74 |
| 6,370,614 B1 | * | 4/2002 | Teoman et al. | 711/113 |
| 2002/0083264 A1 | * | 6/2002 | Coulson | 711/112 |
| 2003/0163663 A1 | * | 8/2003 | Aasheim et al. | 711/202 |
| 2004/0177216 A1 | * | 9/2004 | Asari et al. | 711/103 |
| 2008/0215800 A1 | * | 9/2008 | Lee et al. | 711/103 |
| 2010/0037002 A1 | * | 2/2010 | Bennett | 711/103 |
| 2010/0079910 A1 | * | 4/2010 | Tomizawa et al. | 360/110 |
| 2010/0082904 A1 | * | 4/2010 | Juenemann et al. | 711/119 |

FOREIGN PATENT DOCUMENTS

| | | |
|---|---|---|
| KR | 2005-57006 | 6/2005 |
| KR | 2006-52236 | 5/2006 |
| KR | 2007-10414 | 1/2007 |

OTHER PUBLICATIONS

IBM. IBM Technical Disclosure Bulletin, Feb. 1, 1988. pp. 45-46.*

* cited by examiner

*Primary Examiner* — Larry Mackall
(74) *Attorney, Agent, or Firm* — Cesari & Reed, LLP; Kirk A. Cesari

(57) ABSTRACT

A method of controlling a hybrid hard disk drive. The method includes receiving a read command from a host; searching metadata of a file to be read; determining whether the metadata satisfies a predetermined setup condition; and if the metadata satisfies the setup conditions, copying the file to be read, from a first storage device and storing the file in a second storage device.

25 Claims, 4 Drawing Sheets

SELECTION OF DATA STORAGE LOCATIONS BASED ON ONE OR MORE CONDITIONS

CROSS-REFERENCE TO RELATED APPLICATIONS

This application claims the benefit under 35 U.S.C. §119(a) of Korean Patent Application No. 10-2008-0090003, filed on Sep. 11, 2008, in the Korean Intellectual Property Office, the disclosure of which is incorporated herein in its entirety by reference.

BACKGROUND

1. Field of the Invention

The present general inventive concept relates to a hard disk drive, and more particularly, to a hybrid hard disk drive including a hard disk as a first storage device and a non-volatile memory as a second storage device.

2. Description of the Related Art

A hard disk drive is a data storage device that writes data to a disk or reads the data recorded to the disk using a magnetic head. In order to manufacture hard disk drives with higher storage capacity and smaller weight, the bit per inch (BPI), that is, the density in the disk rotation direction, and the track per inch (TPI), that is, the density in the radius direction, have been increased. Also, the flying height of the magnetic head has been reduced and the recording frequency has been increased.

Meanwhile, a hybrid hard disk drive which includes not only a hard disk as a first storage device but also a non-volatile memory device as a second storage device has been developed.

A conventional hybrid hard disk drive requires a longer reproduction time for moving image data than the data transmission speed when a large size file including the moving image data is transmitted to a host, and thus the data transmission speed needs to be adjusted according to the reproduction time of the moving image data. Accordingly, a conventional hybrid hard disk drive can send a spindle motor or a voice coil motor into a power-saving mode until the host ends the reproduction of the moving image data. This creates problems in terms of power consumption and system performance.

SUMMARY

The present general inventive concept provides a hybrid hard disk drive, a method of controlling the hybrid hard disk drive, and a recording medium for the hybrid hard disk drive, wherein when a host requests the hybrid hard disk drive to perform a reading operation related to data having a large capacity, such as a moving image, the hybrid hard disk drive reads the large capacity data file from a non-volatile memory device and transmits the data file to the host, thereby increasing the transmission speed and reducing the power consumption.

Additional aspects and utilities of the present general inventive concept will be set forth in part in the description which follows and, in part, will be obvious from the description, or may be learned by practice of the general inventive concept.

Embodiments of the present general inventive concept provide a method of controlling a hybrid hard disk drive, the method including receiving a read command from a host; searching for metadata of a file to be read; determining whether the metadata satisfies a predetermined setup condition; and if the metadata satisfies the setup conditions, copying the file to be read from a first storage device and storing the file in a second storage device.

The method of controlling the hybrid hard disk drive may also include storing a logic block address of the file to be read when the metadata satisfies the setup condition to a predetermined logic block address list.

The method of controlling the hybrid hard disk drive may also include determining whether a logic block address of the file to be read exists in the logic block address list, and if the logic block address exists in the logic block address list, reading the file to be read from the second storage device and transmitting the file to be read to the host.

The metadata may include at least one of a file path, a file extension, a file capacity, and a file name. The metadata may exist in a portion of the first storage device.

The setup condition may include a file extension condition, a file capacity condition, or a file name condition. The setup condition may be added, modified, or deleted by the user.

The logic block address list may exist in a portion of the second storage device.

Embodiments of the present general inventive concept also provide a method of controlling a hybrid hard disk drive, the method including determining whether information of a file to be read satisfies a predetermined setup condition; if the information of the file to be read satisfies the setup condition, copying the file to be read from a first storage device and storing the file to be read in a second storage device; and transmitting the file to be read, which is stored in the second storage device, to a host.

The method of controlling the hybrid hard disk drive may also include, if the information satisfies the setup condition, storing a logic block address of the file to be read in a predetermined logic block address list, and determining whether the logic block address of the file to be read exists in the logic block address list.

Embodiments of the present general inventive concept also provide a hybrid hard disk drive including a first storage device that is used as a main storage device; a second storage device that is used as a sub-storage device; and a central processing unit that receives a read command from a host and determines whether a logic block address of a file to be read exists in a predetermined logic block address list, and wherein if the logic block address does not exist in the address list, the central processing unit determines whether metadata of the file to be read satisfies a predetermined setup condition, and if the metadata satisfies the setup condition, the central processing unit copies the file to be read from the first storage device and stores the file in the second storage device.

If the logic block address exists in the logic block address list, the central processing unit may read the file to be read from the second storage device and may transmit the file to be read to the host.

If the file to be read does not satisfy the setup condition, the central processing unit may read the file to be read from the first storage device and may transmit the file to be read to the host.

The first storage device may include at least one disk, and the second storage device may be a PRAM, an FRAM, an MRAM, an RRAM, an NRAM, a NAND flash memory, or a NOR flash memory.

Embodiments of the present general inventive concept also provide a hybrid hard disk drive including a non-volatile memory to store a logic block address list, a disk to store file metadata information and a controller to receive a read/write command from a host and determine whether a logic block address of a file specified in the read/write command exists in the logic block address list. If the logic block address does not exist in the logic block address list, the controller may determine whether metadata of the file satisfies a condition. If the metadata satisfies the condition, the controller may copy the file from the disk and stores the file in the non-volatile memory.

If the logic block address exists in the logic block address list, the controller may read the file to be read from the non-volatile memory and transmit the file to be read to the host. If the logic block address exists in the logic block address list, the controller may write to the file on the non-volatile memory.

If the file to be read does not satisfy the condition, the controller may read the file to be read from the disk and transmit the file to be read to the host. If the file to be written to does not satisfy the condition, the controller may write to the file on the disk.

The controller may be a digital signal processor, a microcontroller, and a microprocessor. The non-volatile memory may be a PRAM, an FRAM, an MRAM, an RRAM, an NRAM, a NAND flash memory, and a NOR flash memory.

Embodiments of the present general inventive concept also provide a hybrid hard disk drive including a non-volatile memory to store a data file meeting a predetermined condition; a logic block address list storage device to store a logic block address of the data file meeting the predetermined condition; a disk to store a plurality of data files including the data file meeting a predetermined condition; a file metadata information storage device to store file metadata for the plurality of data files; and a controller to receive a read/write command from a host and to determine whether the logic block address of a file specified in the read/write command exists in the logic block address list storage device, and if the logic block address is determined not to be in the logic block address list storage device, the controller determines whether metadata of the file satisfies the predetermined condition by comparing metadata stored in the file metadata information storage device with the predetermined condition, and if the metadata is determined to satisfy the predetermined condition, the controller copies the file from the disk and stores the file in the non-volatile memory.

Embodiments of the present general inventive concept also provide a method of controlling a hybrid hard disk drive, the method including receiving a read command from a host, searching a list of files in non-volatile memory for a file specified in the read command, if the file is in the list of files, reading the file from the non-volatile memory and transmitting the file to the host, if the file is not in the list of files, searching for the file on a disk, if the file meets a condition, reading the file from the disk, writing the file to the non-volatile memory, transmitting the file to the host from the non-volatile memory, and updating the list of files, if the file does not meet the condition, reading the file from the disk and transmitting the file to the host.

The condition may include a file extension condition, a file capacity condition, or a file name condition.

The condition may be added, modified, or deleted by the user.

Embodiments of the present general inventive concept also provide a method of controlling a hybrid hard disk drive, the method including receiving a write command from a host, searching a list of files in non-volatile memory for a file specified in the write command, if the file is in the list of files, writing to the file on the non-volatile memory, if the file is not in the list of files, searching for the file on a disk, if the file meets a condition, reading the file from the disk, writing the file to the non-volatile memory, writing to the file on the non-volatile memory, and updating the list of files, if the file does not meet the condition, writing to the file on the disk.

The condition may include a file extension condition, a file capacity condition, or a file name condition.

The condition may be added, modified, or deleted by the user.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
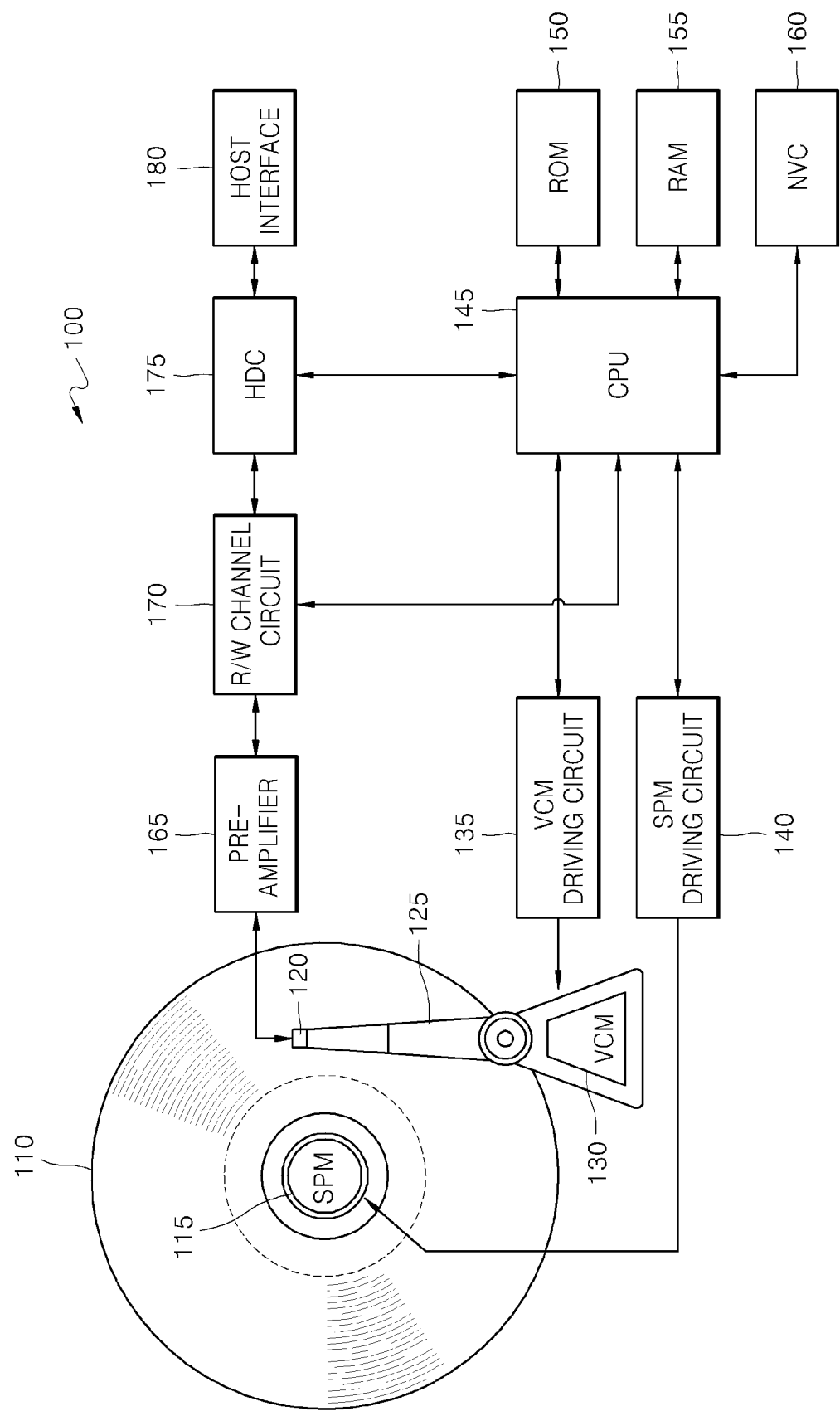
FIG. 1 illustrates a hybrid hard disk drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a hybrid hard disk drive (HDD) 100 according to an embodiment of the present general inventive concept.

Referring to FIG. 1, the hybrid HDD 100 includes a disk 110, a spindle motor 115, a head 120, an actuator 125, a voice coil motor (VCM) 130, a VCM driving circuit 135, a spindle motor (SPM) driving circuit 140, a central processing unit (CPU) 145, a read only memory (ROM) 150, a random access memory (RAM) 155, a non-volatile cache (NVC) 160, a pre-amplifier 165, a read/write (R/W) channel circuit 170, a hard disk controller (HDC) 175, and a host interface 180.

The disk 110 is a double-sided disk, one side of which is used as a data recording surface. One, two, or more disks 110 may be provided. In general, information is written on concentric tracks of the disk 110. The head 120 is used to write data to the disk 110 and read the data from the disk 110. The head 120 includes a write head and a read head. A plurality of heads 120 may be provided. The actuator 125 moves the head 120 mounted thereon across the disk 110.

The speed of the spindle motor 115 is controlled by the SPM driving circuit 140. The spindle motor 115 rotates the disk 110 with a predetermined speed. The VCM driving circuit 135 controls the speed of the voice coil motor 130, and the voice coil motor moves the actuator 125 within a predetermined range. The pre-amplifier 165 amplifies a reading signal read by the head 120 and converts write data to a writing current. The R/W channel circuit 170 performs analog-to-digital (A/D) conversion to the reading signal, encodes the write data, and decodes the read data.

The HDC 175 transmits a command received from a host (not shown) to the CPU 145, and transmits data received from the R/W channel circuit 170 to the host. The ROM 150 stores control programs and various parameters. The RAM 155 provides an operation space for the CPU 145. The NVC 160 is a non-volatile memory to which data can be written. The NVC 160 may be a NAND flash memory or a NOR flash memory. The CPU 145 controls the whole process, and may be a micro-processor or a digital signal processing unit.

Upon receiving a read command from the host, the CPU 145 searches whether the logic block address (LBA) of the file to be read, which is the object of the read command, is included in a predetermined LBA list. The LBA list refers to LBAs of a data file that is stored both on the disk 110 and in the NVC 160 at the same time. The LBA list may exclude data files that are stored only in the disk 110. The LBA list may be information that exists in some portions of the NVC 160. When the LBA of the file to be read exists in the LBA list, the CPU 145 reads the data file having the LBA from the NVC 160 and transmits the data file to the host.

When the LBA of the file to be read does not exist in the LBA list, the CPU 145 searches for metadata of the file having the LBA. The metadata may be information that exists in some portions of the disk 110. The metadata may include a file path, a file name, the capacity of the file, and a file extension. The CPU 145 determines whether the metadata satisfies a setup condition. The setup condition may be an extension (e.g., *.mpg) or a capacity, e.g., 100 Mb or greater, etc., and may also be modified by the user. The setup condition is set by the user to determine which files, specified by type or size or other criteria, are stored commonly on the NVC 160 and which files are stored commonly on the disk 110. Generally, the NVC 160 is faster than the disk 110 and stores larger files, while the disk 110 stores smaller files which may be accessed less frequently.

When the metadata satisfies the setup condition, the CPU 145 reads the file to be read from the disk 110 and stores the file in the NVC 160, and transmits the file to be read that is stored in the NVC 160 to the host. The CPU 145 adds an LBA of the file to be read to the LBA list to update the LBA list. When the metadata does not satisfy the setup condition, the CPU 145 reads the file to be read from the disk 110 and transmits the file to the host.

Figure 2:
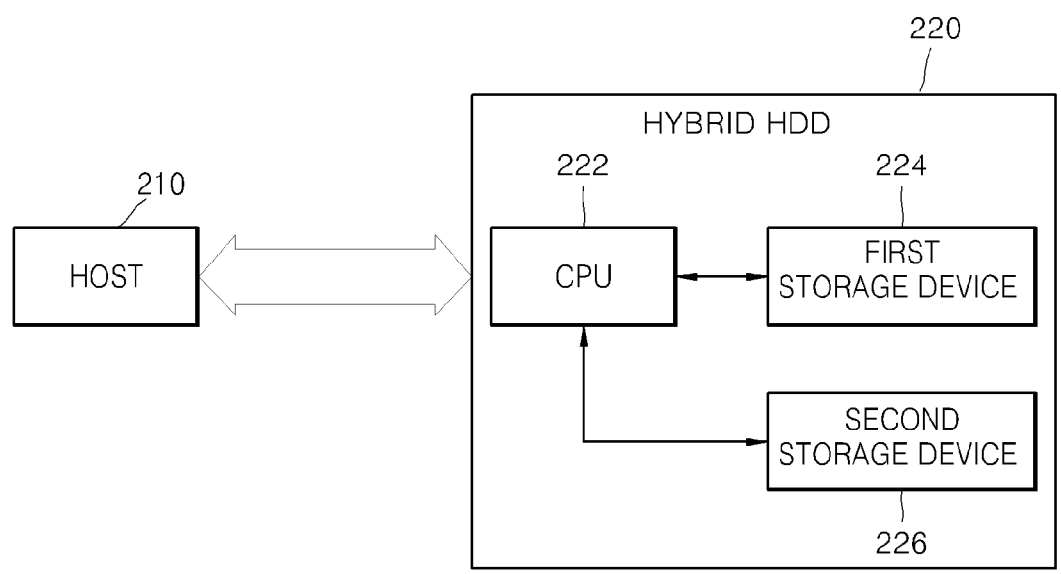
FIG. 2 illustrates a computer system including a hybrid hard disk drive according to an embodiment of the present general inventive concept.

FIG. 2 illustrates a computer system including a hybrid HDD according to an exemplary embodiment of the general inventive concept.

Referring to FIG. 2, the computer system includes a host 210 and a hybrid HDD 220. The hybrid HDD 220 includes a CPU 222, a first storage device 224, and a second storage device 226.

The host 210 may be a personal computer or a micro-processor mounted in a personal computer. The host 210 transmits a read command to the hybrid HDD 220 and receives reading data from the hybrid HDD 220. The CPU 222 reads a data file stored in the first storage device 224 or the second storage device 226 in response to the read command received from the host 210. The first storage device 224 may be a disk, and the second storage device 226 may be a non-volatile memory. Similarly, the host 210 transmits a write command to the hybrid HDD 220 and writes data to the hybrid HDD 220. The CPU 222 writes to a data file stored in the first storage device 224 or the second storage device 226 in response to the write command received from the host 210.

The CPU 222 searches for metadata of the file to be read, which is the object of the read command that is transmitted from the host 210, and when the searched metadata satisfies predetermined conditions, the CPU 222 copies the file to be read, which is stored in the first storage device 224, to the second storage device 226, and writes an LBA of the file to be read to the LBA list. Similarly, in response to a write command that is transmitted from the host 210, the CPU 222 searches for metadata of the file to be written to. When the searched metadata satisfies predetermined conditions, the CPU 222 copies the file to be written to, which is stored in the first storage device 224, to the second storage device 226, writes to the file in the second storage device 226, and writes an LBA of the file to be read to the LBA list. In the future, when the write or read command regarding the file having the LBA stored in the LBA list is received again, the CPU 222 reads the file to be read from the second storage device 226, and transmits the file to the host 210, or writes to the file to be written to, without requiring access to the first storage device 224.

Figure 3:
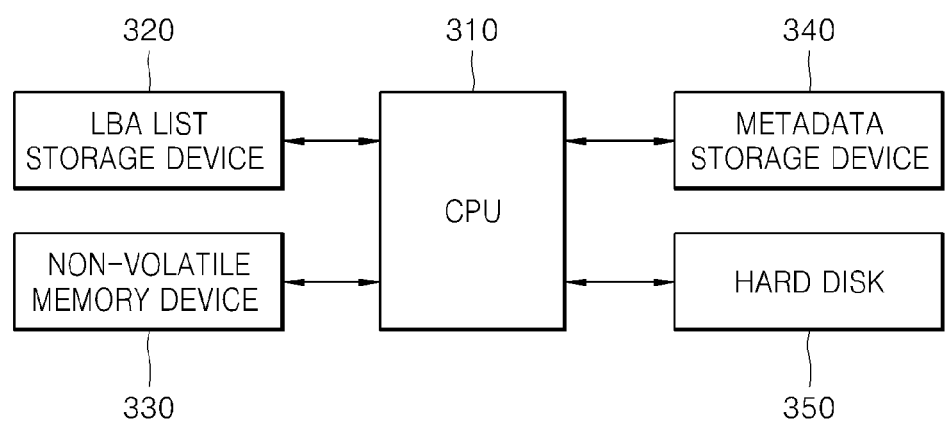
FIG. 3 illustrates a hybrid hard disk drive according to another embodiment of the present general inventive concept.

FIG. 3 illustrates a hybrid HDD drive according to another exemplary embodiment of the general inventive concept.

Referring to FIG. 3, the hybrid HDD includes a CPU 310, an LBA list storage device 320, a non-volatile memory 330, a metadata storage device 340, and a hard disk 350.

The CPU 310 is operated according to a read or write command transmitted from a host (not shown). The CPU 310 may be a digital signal processor, a micro-processor, or a micro-controller. The CPU 310 reads a file to be read, which is the object of the read command, from the non-volatile memory 330 or the hard disk 350 and transmits the file to the host. When the file to be read satisfies condition set by a user, the CPU 310 reads the file to be read from the non-volatile memory 330 and transmits the file to the host. Similarly, the CPU 310 receives a write command from the host and writes data to the file. The CPU 310 writes to a data file stored in the non-volatile memory 330 or the hard disk drive 350.

The LBA list storage device 320 is a medium that stores an LBA of a file to be read or written to, which satisfies a predetermined condition, and may be integrated in the non-volatile memory device 330 instead of being a separate unit. The metadata storage device 340 stores information on the name of the file recorded to the hard disk 350, including, e.g., the extension and the capacity of the file, etc., and may be integrated in the disk 350 instead of being a separate storage device. Examples of the non-volatile memory device 330 include a PRAM, an FRAM, an MRAM, an RRAM, an NRAM, a NAND flash memory, and a NOR flash memory.

Figure 4:
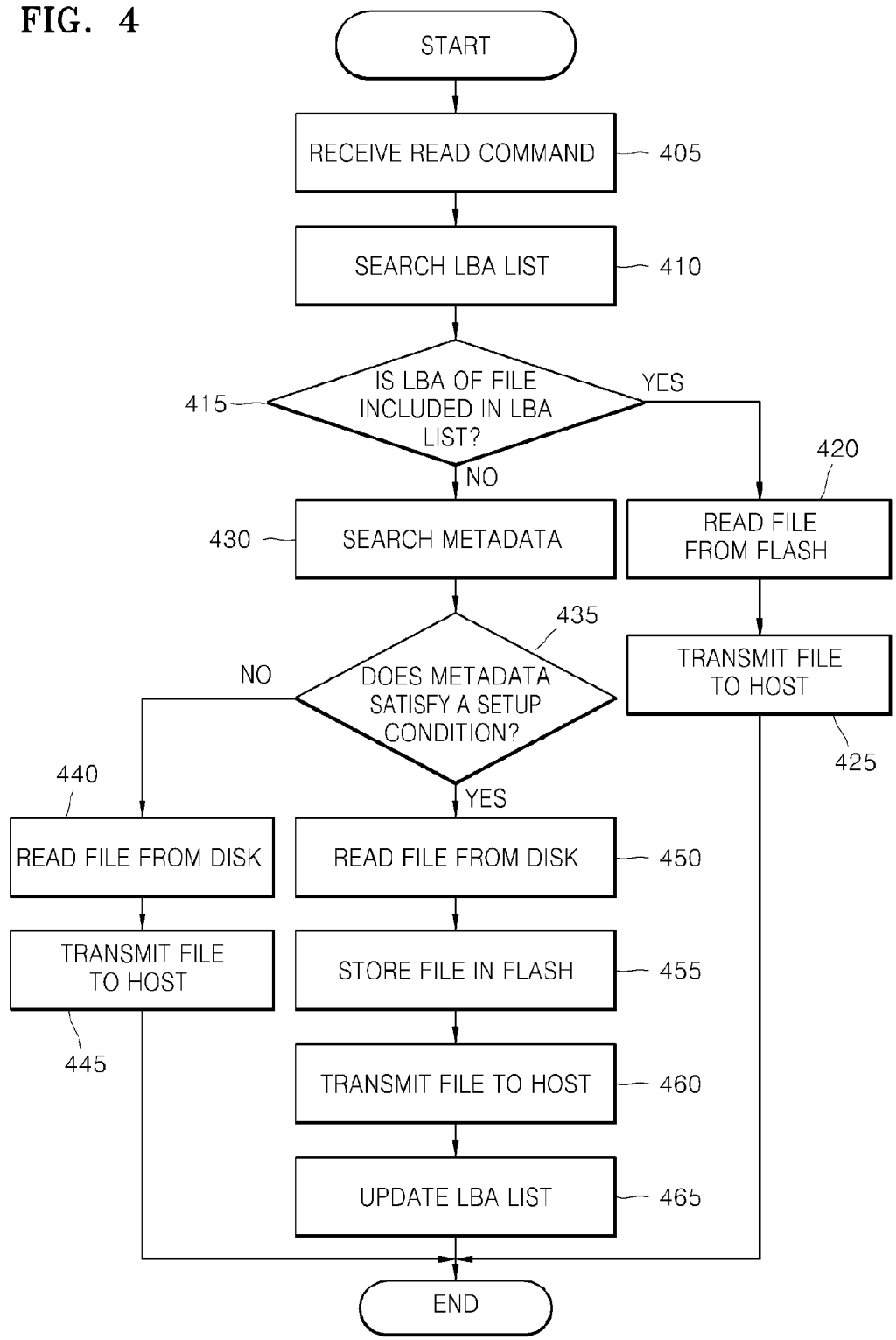
FIG. 4 is a detailed flowchart illustrating a method of controlling a hybrid hard disk drive, according to an embodiment of the present general inventive concept.

FIG. 4 is a detailed flowchart illustrating a method of controlling a hybrid HDD, according to an exemplary embodiment of the general inventive concept.

First, a read command can be received by a hybrid HDD from a host in operation S405. The read command includes a logic block address of a file to be read. Then a predetermined logic block address list is searched for in operation S410. The logic block address list may be stored in the flash memory of the hybrid HDD. In operation S415, it is determined whether the logic block address of the file to be read is included in the logic block address list. If the logic block address is included in the logic block list, the file to be read is read from the flash memory using the logic block address in operation S420. Then, the file that is read is transmitted to the host in operation S425.

If the logic block address of the file to be read is not included in the logic block address list, metadata of the file to be read having the logic block address is searched for in operation S430. The metadata may be data stored in the hard disk of the hybrid HDD. Whether the metadata satisfies a setup condition is determined in operation S435. The setup condition may be an extension (*.mpg) or capacity of 100 Mb or greater, etc., and may also be modified by the user. If the metadata does not satisfy the setup condition, the file to be read is read from the hard disk using the logic block address in operation S440. Then, the file that is read is transmitted to the host in operation S445.

If the metadata satisfies the setup condition, the file to be read is read from the hard disk using the logic block address in operation S450. Then, the file to be read is stored in the flash memory in operation S455. The file to be read from the hard disk and the file, which is stored in the flash memory, have the same logic block address. The file that is read is transmitted to the host in operation S460. The logic block address of the file to be read is stored in the logic block address list in operation S465.

Figure 5:
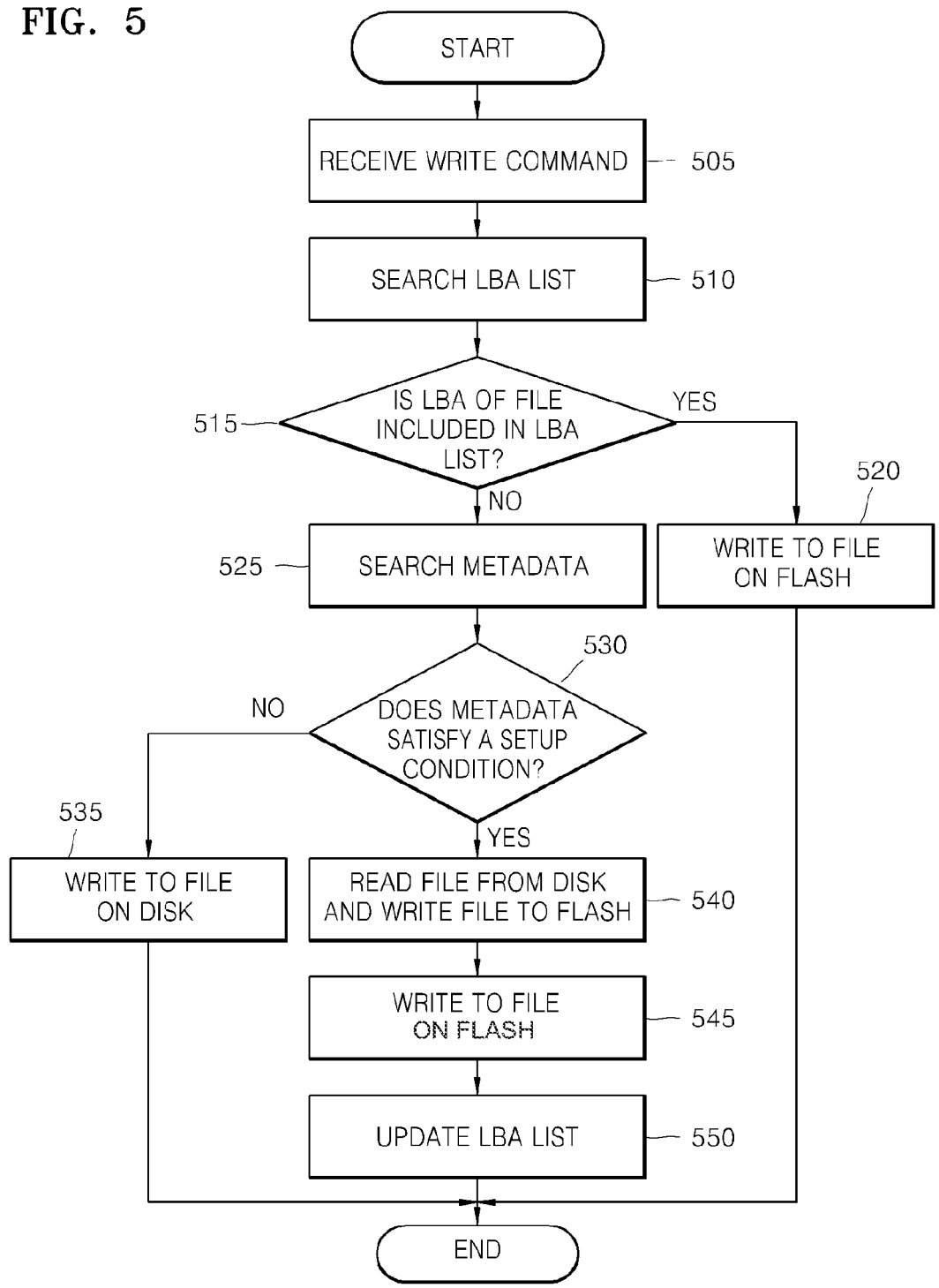
FIG. 5 is a detailed flowchart illustrating a method of controlling a hybrid hard disk drive, according to an embodiment of the present general inventive concept.

FIG. 5 is a detailed flowchart illustrating a method of controlling a hybrid HDD, according to another exemplary embodiment of the general inventive concept.

First, a write command is received by a hybrid HDD from a host in operation S505. The write command includes a logic block address of a file to be written to. Then a predetermined logic block address list is searched for in operation S510. The logic block address list may be stored in the flash memory of the hybrid HDD. In operation S515, it is determined whether the logic block address of the file to be written to is included in the logic block address list. If the logic block address is included in the logic block list, the file to be written to is written to on the flash memory using the logic block address in operation S520.

If the logic block address of the file to be written to is not included in the logic block address list, metadata of the file to be written to having the logic block address is searched for in operation S525. The metadata may be data stored in the hard disk of the hybrid HDD. Whether the metadata satisfies a setup condition is determined in operation S530. The setup condition may be an extension (*.mpg) or capacity of 100 Mb or greater, etc., and may also be modified by the user. If the metadata does not satisfy the setup condition, the file to be written to is written to on the hard disk using the logic block address in operation S535.

If the metadata satisfies the setup condition, the file to be written to is read from the hard disk using the logic block address in operation S540 and written to the flash memory. Then, the file is written to in the flash memory in operation S545. The file to be written to on the hard disk and the file, which is stored in the flash memory, have the same logic block address. The logic block address of the file written to is stored in the logic block address list in operation S550.

The inventive concept may be executed as a method, an apparatus, or a system, etc. When the inventive concept is executed as software, elements of the inventive concept are code segments that conduct required operations. Program or code segments may be stored in a processor readable medium, and be transmitted by computer data signals that are coupled to carriers in transmission media or communication network.

The processor readable medium includes any medium that is capable of storing or transmitting information. Examples of the processor readable medium include an electronic circuit, a semiconductor memory device, a ROM, a flash memory, a floppy disk, a hard disk, an optical fiber medium, etc. Examples of the computer data signal include any signal that can be transmitted via transmission media such as an electronic network channel, optical fiber, air, an electronic system, a wireless frequency network, etc.

According to the hybrid HDD of the inventive concept, when a host requests a read operation of a data file having a large capacity that requires a long reproduction time such as a moving image, the large capacity data file stored in the hard disk is stored in a non-volatile memory device having high data access speed, and then the data file is read from the non-volatile memory. Thus, power consumption required for searching a hard disk can be reduced.

While the present general inventive concept has been particularly shown and described with reference to exemplary embodiments thereof, the terms used herein are for illustrative purpose of the present general inventive concept only and should not be construed to limit the meaning or the scope of the present general inventive concept as described in the claims.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method comprising:
    receiving a read command from a host;
    searching for metadata of a file to be read;
    determining whether the metadata satisfies a predetermined setup condition includes whether a size of the file exceeds a threshold size; and
    if the metadata satisfies the predetermined setup condition by exceeding the threshold size, copying the file to be read from a first nonvolatile data storage device including a disk and storing the file in a second nonvolatile data storage device including a nonvolatile solid state memory.

2. The method of claim 1, further comprising:
    storing a logic block address of the file to be read when the metadata satisfies the setup condition to a predetermined logic block address list.

3. The method of claim 2, further comprising:
    determining whether a logic block address of the file to be read exists in the logic block address list; and
    if the logic block address exists in the logic block address list, reading the file to be read from the second storage device and transmitting the file to be read to the host.

4. The method of claim 2, wherein the logic block address list exists in a portion of the second storage device.

5. The method of claim 1, wherein the predetermined setup condition also includes whether the file is a certain type of file.

6. The method of claim 5, wherein the metadata exists in a portion of the first storage device.

7. The method of claim 1, wherein the setup condition includes a file name condition.

8. The method of claim 1, wherein the setup condition can be modified by the user.

9. A memory device having embodied thereon a computer program to execute the method of claim 1.

10. A method comprising:
    determining whether information of a file to be read satisfies a predetermined setup condition including whether a size of the file exceeds a threshold size;
    if the information of the file to be read satisfies the setup condition by exceeding the threshold size, copying the file to be read from a first disk storage device and storing the file to be read in a second nonvolatile solid state storage device; and
    transmitting the file to be read, which is stored in the second nonvolatile solid state storage device, to a host.

11. The method of claim 10, further comprising:
if the information satisfies the setup condition, storing a logic block address of the file to be read in a predetermined logic block address list; and
determining whether the logic block address of the file to be read exists in the logic block address list.

12. A memory device having embodied thereon a computer program to execute the method of claim 10.

13. An apparatus comprising:
a first nonvolatile data storage medium including a disk;
a second nonvolatile data storage medium including a non-volatile solid state memory; and
a central processing unit configured to determine when a file satisfies a condition by exceeding a threshold size, and
when the file satisfies the condition by exceeding the threshold size, the central processing unit is configured to copy the file from the first nonvolatile data storage medium and store the file in the second nonvolatile data storage medium.

14. The apparatus of claim 13, wherein if a logic block address exists in a logic block address list, the central processing unit reads the file from the second nonvolatile data storage medium and transmits the file to a host, and if the logic block address does not exist in the logic block address list, the central processing unit determines the condition.

15. The apparatus of claim 13, wherein if the file does not satisfy the condition, the central processing unit reads the file from the first nonvolatile data storage medium and transmits the file to a host.

16. The apparatus of claim 13, wherein the second nonvolatile data storage medium is a flash memory.

17. An apparatus comprising:
a non-volatile solid state memory;
a disk data storage medium; and
a controller configured to receive a read/write command from a host and to determine whether a logic block address of a file specified in the read/write command exists in a logic block address list, such that if the logic block address is determined not to exist in the logic block address list, the controller determines whether metadata of the file satisfies a condition by exceeding a threshold size, and if the metadata satisfies the condition by exceeding the threshold size, the controller copies the file from the disk data storage medium and stores the file in the non-volatile solid state memory.

18. The apparatus of claim 17, wherein if the logic block address exists in the logic block address list, the controller reads the file to be read from the non-volatile solid state memory and transmits the file to be read to the host.

19. The apparatus of claim 17, wherein if the logic block address exists in the logic block address list, the controller writes to the file on the non-volatile solid state memory.

20. The apparatus of claim 17, wherein if the file to be read does not satisfy the condition, the controller reads the file to be read from the disk data storage medium and transmits the file to be read to the host.

21. The apparatus of claim 17, wherein if the file to be written to does not satisfy the condition, the controller writes to the file on the disk data storage medium.

22. The apparatus of claim 17, wherein the controller comprises a microprocessor.

23. The apparatus of claim 17, wherein the non-volatile solid state memory comprises at least one of a PRAM, an FRAM, an MRAM, an RRAM, an NRAM, a NAND flash memory, and a NOR flash memory.

24. A method comprising:
receiving a command to store a file;
comparing a size of the file to a threshold size;
when the size is less than the threshold size, storing the file to a nonvolatile disk memory;
when the size is greater than the threshold, storing the file to a non-volatile solid-state memory.

25. The method of claim 24, wherein the threshold can be modified by the user.

* * * * *